United States Patent [19]

Bams et al.

[11] Patent Number: 4,650,690
[45] Date of Patent: Mar. 17, 1987

[54] EDIBLE WATER-IN-OIL-IN-WATER EMULSION

[75] Inventors: Gijsbert W. Bams, Rotterdam; Wilhelmus H. van Megen, Stolwijk, both of Netherlands

[73] Assignee: Thomas J. Lipton Inc., Englewood Cliffs, N.J.

[21] Appl. No.: 669,584

[22] Filed: Nov. 8, 1984

[30] Foreign Application Priority Data

Nov. 9, 1983 [NL] Netherlands .......................... 8303848
Apr. 2, 1984 [NL] Netherlands .......................... 8401026

[51] Int. Cl.$^4$ ........................... A23D 5/00; A23D 5/02
[52] U.S. Cl. ..................................... 426/602; 426/605; 426/613
[58] Field of Search ......................... 426/602, 605, 613

[56] References Cited

U.S. PATENT DOCUMENTS 4,034,124 7/1977 van Dam ......................... 426/605 X
4,254,105 3/1981 Fukuda .
4,336,272 6/1982 Verrips et al. ................... 426/602 X

FOREIGN PATENT DOCUMENTS 0075368 7/1978 Japan .................................... 426/605
0151479 11/1981 Japan .................................... 426/602
175475 10/1982 Japan .
0076065 5/1983 Japan .................................... 426/605
59-01270 4/1984 Japan .................................... 426/602
1527526 10/1978 United Kingdom .

Primary Examiner—Robert Yoncoskie
Attorney, Agent, or Firm—Brumbaugh, Graves, Donohue & Raymond

[57] ABSTRACT

The invention provides edible water-in-oil-in-water emulsions containing an emulsifying system in which the continuous aqueous phase has a pH between 6.5 and 2.0, contains between 10 and 80 wt. % of an oil and of which the discontinuous phase is at least 10 wt. % of the discontinuous aqueous phase and oil phase taken together. Preferably an o/w emulsifier such as protein, in particular egg yolk, is present and also a w/o emulsifier. The oil phase preferably has no solid constituents at 20° C. The emulsions are useful as foodstuffs such as sauces and dressings, and in soups and ice-cream.

8 Claims, No Drawings

EDIBLE WATER-IN-OIL-IN-WATER EMULSION

There is an increasing demand for foodstuffs having a relatively low energy content. Therefore efforts have been made to produce foodstuffs having a reduced lipid and sugar content. As such are known: low calorie spreads, e.g. water-in-oil (w/o) emulsions, and oil-in-water (o/w) emulsions, such as sauces, in particular salad dressings of the mayonnaise type having a reduced lipid content. Still, in order to give these products, in particular sauces, a firm consistency and sufficient stability, it was necessary to incorporate in these products a rather large amount, viz up to 5 wt. % (dry matter), of a thickening agent, such as starch, gums, carboxymethylcellulose, etc. (GB-A-1 527 526). The disadvantage thereof is, however, that the sauces thus thickened contain an additional ingredient which often results in sauces with a slimy and/or pappy, less smooth and even somewhat grainy impression in the mouth. In some countries there are also limitations in this respect owing to Foods Regulations.

It is an object of the present invention to overcome these drawbacks by providing an edible water-in-oil-in-water (w/o/w) emulsion, the continuous aqueous phase of which has a pH between 6.5 and 2.0, preferably between 4.5 and 3.0 and which contains between 10 and 80 wt.%, preferably between 30 and 50 wt.%, calculated on the total w/o/w emulsion, of a triglyceride oil and of which the discontinuous aqueous phase is at least 10 wt.% of discontinuous aqueous phase and oil phase together (thus, calculated on the originally prepared w/o emulsion). Preferably that percentage amounts to at least 30%, more preferably a minimum of 50%. The required pH of the continuous aqueous phase is obtained by judicious addition of a "food acid", such as acetic acid, citric acid, lactic acid etc. As was found, these low energy products can then possess a smooth, creamy impression in the mouth and they are excellent foodstuffs.

Triglyceride oils that are especially suitable for the present invention are vegetable oils having an iodine value between 70 and 110, such as soybean oil, including partially hydrogenated, sunflower oil, maize germ oil, olive oil, peanut oil, etc. Not only unsaturated fatty acid triglyceride esters can be used, but also their admixtures with sucrose esters containing 3–8 fatty acid radicals per sucrose molecule.

According to the invention, the oil preferably contains no solid phase at 20° C.

W/o/w emulsions are known from U.S. Pat. No. 4,254,105 (Hidenori Fukada). However, the double w/o/w-type emulsions known from this specification contain paraffin oil and, moreover, show a higher pH-value than those according to the present invention. These double emulsions known from the art are used as cosmetics and not as foodstuff.

Further, JA-A-175 475/82 (of QP Corporation) discloses double emulsions of the w/o/w type which, however, have a particularly small percentage of a discontinuous aqueous phase (maximum 3.2%). Moreover, these emulsions contain solid calcium carbonate.

In the case of the w/o/w emulsions according to the invention it is desirable that the continuous aqueous phase and the discontinuous aqueous phase have a different composition and they need not be isotonic. It is normal practice with double emulsions to use an emulsifier system in which at least one w/o emulsifier is present. W/o emulsifiers that are useful have an HLB-value of at most 6. In practice, sorbitan esters, sucrose esters and polyglycerol esters of fatty acids, optionally polymerized fatty acids, are preferred.

It is also customary to use in addition to the w/o emulsifier an o/w emulsifier having an HLB-value of at least 8. As such, polyoxyethylene sorbitan esters, protein and egg yolk are suitable. Of these, egg yolk is preferred according to the present invention in connection with the excellent stability of the double emulsion obtained therewith.

The amount of the w/o emulsifier in the emulsifier system is between 0.1 and 10, preferably between 0.2 and 5.0 wt.% of the total emulsion. In most cases the emulsifier system will contain an o/w emulsifier such as a protein, more particularly egg yolk, which optionally has been subjected to a pre-treatment (e.g. modified with phospholipase $A_2$, which is preferred). Also milk protein, blood protein, etc. are suitable for this purpose. The amount of protein or egg yolk used is as a rule between 0.1 and 5.0 wt.%, preferably between 0.5 and 2.0 wt.% of the total emulsion.

In exceptional cases, e.g. with certain emulsions having a low oil content, it can be advantageous to use a small amount (up to 1%) of a thickening agent in the discontinuous aqueous phase. Certain proteins and polysaccharides such as gelatin and vegetable gums are suitable for this purpose. Furthermore, it is preferred that the aqueous phases contain a soluble salt, in particular common salt. The salt concentration in the aqueous phases ranges between 1 and 8%. The concentrations of the various constituents in both aqueous phases is mostly different.

Other conventional ingredients, such as sugar, flavours, colouring agents, preservatives, etc. will as a rule also be present, but no insoluble inorganic material. The w/o/w emulsions according to the invention can be prepared in a two-step process. A stable w/o emulsion is first of all prepared by emulsifying water, oil and an emulsifier of the w/o type in a mixer. This w/o emulsion is then added to an aqueous phase (the later aqueous phase) in which the o/w emulsifier is present, (pre-emulsion) and continuous homogenization is carried out. In this way a stable w/o/w emulsion is obtained, showing excellent organoleptical behaviour.

The edible w/o/w emulsions according to the present invention can especially be used as sauces, salad dressing, French-fry sauce, barbecue sauce, etc. and notwithstanding a smaller amount of lipids than is normally present in such products, they give a pleasant creamy mouth-feel also in e.g. soups and ice-cream.

The invention will be illustrated by the following Examples

EXAMPLE I

By means of an Ultra-Turrax, a high speed stirring motor of the rotor/stator type (ex Janke and Kunkel, Germany), a solution of 8.9 g sucrose
  22.3 g common salt
  2.2 g sorbic acid
  32.2 g acetic acid (10%)

in 816.0 g of water was added slowly, i.e. in 3 minutes, to a mixture of 893.0 g of soybean oil (iodine value 105) and 25.0 g of a w/o emulsifier (a polyglycerol ester of polymerized castor oil fatty acids) and this was vigorously stirred for 2 minutes to obtain a stable w/o emulsion which contained 49% aqueous phase and 51% oil phase. This w/o emulsion was slowly, i.e. in 3 minutes, added to a mixture of:
90.0 g fresh egg yolk
6.5 g sucrose
20.0 g common salt
2.0 g sorbic acid
11.0 g acetic acid (10%)
70.0 g water
while mixing with the aid of a kitchen mixer (Kenwood Chef) in the 4-position. The pre-emulsion thus obtained was de-aerated and homogenized with the aid of a Presto-Mill (homogenizer of the rotor/stator type on a laboratory scale). The final product obtained showed a mayonnaise-like character and gave a smooth, creamy impression in the mouth.

EXAMPLE II

In accordance with the method of Example I, a mixture of
15.0 g sucrose
15.0 g common salt
1.0 g potassium sorbate
45.0 g acetic acid (10%)
924.0 g water
was added to 775.0 g of soybean oil and 25.0 g of the w/o emulsifier of Example I. The water-in-oil emulsion thus obtained was added to a mixture consisting of
90.0 g fresh egg yolk
15.0 g sucrose
15.0 g common salt
1.0 g potassium sorbate
15.0 g acetic acid (10%)
64.0 g water
in order to obtain a pre-emulsion of the w/o/w-type.
After homogenization, a dressing-like product was obtained which left an excellent creamy impression in the mouth.

EXAMPLE III

In a way analogous to that described in Example I a solution of
9.0 g sucrose
22.6 g common salt
3.0 g potassium sorbate
70.0 g acetic acid (10%) in
774.4 g of water
was added to a mixture of
887.0 g soybean oil
4.0 g beta-carotene solution (0.2%)
2.0 g mustard oil
25.0 g of the w/o emulsifier of Example I
in such a way that a w/o emulsion was formed containing 49% by weight of aqueous phase and 51% by weight of oil phase which was then added to a mixture of
98.0 g technical egg yolk (92% egg yolk; 7% NaCl; 1% potassium sorbate)
6.5 g sucrose
13.2 g common salt
2.0 g potassium sorbate
25.0 g acetic acid (10%)
0.4 g flavour
1.0 g mustard flavour
53.9 g water
in order to obtain a pre-emulsion of the w/o/w-type.
After homogenization, the product had a mayonnaise-like, creamy character, both physically and organoleptically.

EXAMPLE IV

In a way analogous to that described in Example I, a solution of
8.0 g sucrose
22.1 g common salt
2.7 g potassium sorbate
62.2 g acetic acid (10%)
in 689 g of water was added to 793.8 g of soybean oil and 22.2 g of Homodan PT (a w/o emulsifier, polyglycerol ester of polymerized soybean oil) so as to obtain a stable w/o emulsion. The w/o emulsion formed was then added to a mixture of
50.0 g fresh egg yolk
30.0 g concentrated whey protein preparation
20.0 g sucrose
3.0 g potassium sorbate
80.0 g acetic acid (10%)
217.0 g water.
The in w/o/w pre-emulsion thus formed, after homogenization showed dressing-like properties and a good behaviour in the mouth.

| Example | Physical/analytical measurements | | | |
| --- | --- | --- | --- | --- |
| | C-value ($g/cm^2$) | Bostwick value (cm) | moisture separation | pH (%) |
| I | 111 | 0.2 | 3.9 | 4.2 |
| II | 99 | 2.7 | 9.9 | 4.1 |
| III | 107 | 0.7 | 4.1 | 3.9 |
| IV | 88 | 6.7 | 6.1 | 3.9 |

C-value: Measured with a cone penetrometer ex Sommer und Ruhe Berlin-Friedemann Cone 40° and weighing 80 g
Bostwick value: Bostwick consistometer ex Cenco Instruments Co, Chicago, USA in operation: 30 seconds
% Moisture separation: After centrifugation for 10 minutes at 1500×g

EXAMPLES V, VI, VII, AND VIII

In a way analogous to that described in Example I, double emulsions of the W/O/W type were prepared from the following ingredients.

| | | | | |
| --- | --- | --- | --- | --- |
| Soya bean oil | 1356.0 | 1259.0 | 466.9 | 774.0 |
| Carotene solution | 7.4 | 7.1 | — | 6.0 |
| W/O Emulsifier of Ex.I | 36.6 | 33.9 | 13.1 | 20.0 |
| Sucrose | 25.9 | 87.4 | 84.0 | 146.0 |
| Common salt | 6.6 | 8.3 | 84.0 | 11.4 |
| Potassium sorbate | 0.4 | 0.9 | 5.6 | — |
| Maltodextrin | 5.6 | 14.4 | — | — |
| 10% Acetic acid | 6.5 | 13.8 | 84.0 | — |
| Citric acid | 0.6 | 1.4 | — | — |
| Skimmed milk yoghurt | — | 163.9 | — | — |
| Water | 154.2 | 209.9 | 862.4 | 642.6 |
| Ratio aqueous to oil phase: | 12.5:87.5 | 28:72 | 70:30 | 50:50 |
| Technical egg yolk (Ex.III) (fresh egg yolk) | 174.3 | 89.7 | 180.0 | 60.0 |
| Sucrose | — | — | 30.0 | — |
| Common salt | 6.2 | 3.2 | 30.0 | 11.0 |
| Potassium sorbate | 3.0 | 1.5 | 2.0 | 2.0 |
| Maltodextrin | 27.8 | 14.3 | — | — |
| 10% Acetic acid | 17.4 | 9.0 | 30.0 | 40.0 |
| Citric acid | 0.9 | 0.5 | — | — |
| Mustard | 92.7 | — | — | 13.8 |

| -continued | | | | |
|---|---|---|---|---|
| Water | 77.5 | 81.9 | 128.0 | 273.4 |

*added to the pre-emulsion

The emulsions so obtained showed dressing-like properties and a mayonnaise-like mouth feel.

We claim:

1. An edible water-in-oil-in-water emulsion, comprising between 10 and 80% weight percent of a triglyceride oil, at least one water-in-oil emulsifier, and an oil-in-water emulsifier consisting of egg yolk, wherein the continuous aqueous phase has a pH of between 2.0 and 6.5, and wherein the combined discontinuous aqueous phase and oil phase comprise at least 10% water.

2. An edible water-in-oil-in-water emulsion according to claim 1, wherein the egg yolk emulsifier is present at a level of from 0.1 to 5.0% by weight of the total emulsion.

3. An edible water-in-oil-in-water emulsion according to claim 1, comprising from 0.1 to 10% by weight of the total emulsion of a water-in-oil emulsifier.

4. An edible water-in-oil-in-water emulsion according to claim 1, in which the oil phase contains no solid phase at 20° C.

5. An edible water-in-oil-in-water emulsion according to claim 1, in which the continuous aqueous phase and the discontinuous aqueous phase have a different composition.

6. An edible water-in-oil-in-water emulsion according to claim 1, in which the discontinuous aqueous phase contains up to 1% by weight of the discontinuous aqueous phase of a thickening agent.

7. An edible water-in-oil-in-water emulsion according to claim 1, in which the aqueous phase contains a soluble salt.

8. A process for the preparation of a edible water-in-oil-in-water emulsion, comprising preparing a stable water in oil emulsion by emulsifying a mixture, comprising water, oil and a water-in-oil emulsifier, adding the emulsion thus obtained to an aqueous phase having a pH between 2.0 and 6.5, in which an oil-in-water emulsifier consisting of egg yolk is present, and homogenizing the mixture obtained in such a way that the final water-in-oil-in-water emulsion contains between 10% and 80% by weight of the emulsion of an oil, and such that the discontinuous aqueous phase is at least 10% by weight of the combined discontinuous aqueous phase and oil phase.

* * * * *